United States Patent
Andre

(10) Patent No.: US 8,151,713 B2
(45) Date of Patent: Apr. 10, 2012

(54) BIDIRECTIONAL GUIDANCE SYSTEM WITH LATERAL OSCILLATION LIMITING, FOR ROAD AXLE GUIDED BY A RAIL ON THE GROUND

(75) Inventor: Jean-Luc Andre, Molsheim (FR)

(73) Assignee: Lohr Industrie, Hangenbieten (FR)

( * ) Notice: Subject to any disclaimer, the term of this patent is extended or adjusted under 35 U.S.C. 154(b) by 279 days.

(21) Appl. No.: 12/601,296

(22) PCT Filed: Apr. 22, 2008

(86) PCT No.: PCT/FR2008/000561
§ 371 (c)(1),
(2), (4) Date: Jan. 14, 2010

(87) PCT Pub. No.: WO2008/152215
PCT Pub. Date: Dec. 18, 2008

(65) Prior Publication Data
US 2010/0133034 A1    Jun. 3, 2010

(30) Foreign Application Priority Data
May 25, 2007    (FR) ..................................... 07 03706

(51) Int. Cl.
*B61C 11/00* (2006.01)
(52) U.S. Cl. ..... 105/72.2; 104/243; 104/245; 105/215.1
(58) Field of Classification Search ................. 105/72.2, 105/215.1, 215.2; 104/242, 243, 244, 244.1, 104/245, 246, 247, 248, 103.01, 130.07, 104/139; 172/5; 180/401
See application file for complete search history.

(56) References Cited

U.S. PATENT DOCUMENTS

| | | | | |
|---|---|---|---|---|
| 3,796,165 A * | 3/1974 | Goode | ........................... | 104/247 |
| 3,853,069 A * | 12/1974 | Goodwin | ...................... | 180/401 |
| 3,977,487 A * | 8/1976 | Katayose et al. | ............. | 180/401 |
| 4,231,295 A * | 11/1980 | Forster | ........................... | 104/245 |
| 5,704,295 A * | 1/1998 | Lohr | ........................... | 105/72.2 |
| 6,029,579 A * | 2/2000 | Andre et al. | .................. | 105/72.2 |
| 6,308,640 B1 * | 10/2001 | Weule et al. | .................. | 105/72.2 |
| 6,363,860 B1 * | 4/2002 | Andre | ........................... | 105/72.2 |
| 6,477,963 B1 * | 11/2002 | Weule et al. | .................. | 104/243 |

FOREIGN PATENT DOCUMENTS

| | | |
|---|---|---|
| FR | 2675105 | 10/1992 |
| FR | 2715369 | 7/1995 |
| FR | 2778161 | 11/1999 |

* cited by examiner

*Primary Examiner* — Mark Le
(74) *Attorney, Agent, or Firm* — Davis & Bujold, P.L.L.C.

(57) ABSTRACT

The guidance system comprises two guidance devices (16) mounted in opposite directions either side of the axle (2) and each comprising: a guidance arm (17) terminated by at least one guidance roller (18); a set of articulated connecting rods serving as a deformable link interface (23) between the axle and the guidance arm; and a jack (29) with two independent and opposing rods (30, 31), having a "rods extended" position in which its two rods lock the set of connecting rods to render it rigid and orient the axle, and a "rods retracted" position in which the set of connecting rods is free and allows a lateral oscillation. Preferably, the jack (29) offers an additional function for damping the lateral oscillation. This invention is of interest in the field of the guidance of public transport road vehicles by a rail.

22 Claims, 4 Drawing Sheets

BIDIRECTIONAL GUIDANCE SYSTEM WITH LATERAL OSCILLATION LIMITING, FOR ROAD AXLE GUIDED BY A RAIL ON THE GROUND

This application is a National Stage completion of PCT/FR2008/000561 filed on Apr. 22, 2008 which claims priority from French Application Serial No. 0703706 filed on May 25, 2007.

FIELD OF THE INVENTION

The present invention concerns a bidirectional guide system for limiting lateral displacement of the road axle of a rail-guided vehicle.

The invention is applicable to rail-guided road vehicles, particularly urban passenger transport vehicles.

BACKGROUND OF THE INVENTION

This type of vehicle has a guide device on each of its road axles carrying one or more followers that follow the guide rail and orient the axle using the guide device.

There are for instance known guide devices comprising a single or double arm connected to the axle by a shaft and extending toward the guide rail, with, at the free end, a pair of guide rollers angled in a V, each traveling along an opposing path on the central guide rail.

Now, this type of vehicle usually travels on a dedicated track and alternates in both directions of travel with no U-turn maneuvers. Therefore, it must be possible to guide the vehicle in both directions of travel.

In this case the guide device previously described needs to be duplicated on each axle with a similar device oriented in the other direction, thus forming a bidirectional guide system. Each of the guide devices on the bidirectional guide system is used alternately depending upon the direction in which the vehicle is traveling.

In order to safely and reliably guide the vehicle, the active guide device must be rigidly connected to the corresponding axle for the purpose of transmitting changes in direction to it and consequently orienting it correctly.

If the two opposing guide devices on the bidirectional guide system are rigid in order to orient the axle in any direction the vehicle is traveling, the result is a hyperstatic system with considerable lateral stress impacting it, particularly if there are curves along the route, if there are cross winds, or if skidding on slippery terrain. Consequently, the guide system must be designed to withstand these lateral stresses.

But, the tires on the vehicle are able to absorb this lateral stress without any problems or modifications. Actually, in non-guided vehicles, it is primarily the tires that are subjected to this stress. When turning, for example, they are subjected to lateral acceleration that temporarily deforms their sides.

SUMMARY OF THE INVENTION

One objective of the invention is to provide a bidirectional guide system that does not have to withstand so much lateral stress, but wherein the stress essentially is absorbed by the vehicle tires. Since the guide devices do not undergo such stress, they can then be lighter in construction without being subjected to burdensome size constraints.

For this reason, each guide device on the bidirectional guide system of the invention exists in two states: a director state when in the rigid configuration and a follower state when in the floating configuration; it adopts these states alternately depending upon the vehicle's direction of travel.

Thus, depending on the direction the vehicle is traveling, the guide device located at the front of the axle becomes the director module and it is placed in rigid configuration, ensuring that the vehicle is precisely guided. The guide device located at the rear is disengaged and placed in floating configuration. It then becomes a passive follower module exerting no influence on the guiding process, allowing the axle to deviate laterally to a certain extent, especially during turns or skids under exceptional stress, for example.

In addition, guided vehicles, particularly public urban transport vehicles, must respect a vehicle gauge that delimits a predefined maximal covered area on the road and allows them to travel through narrow passageways and consequently, to adapt to tracks, quays, metro stops, sidewalks, the urban environment, or any other challenges they encounter.

Under certain circumstances, for example, on slippery ground or in the presence of strong cross winds, tires sometimes lose their grip and slide laterally beyond their maximum prescribed boundaries.

Another objective of the invention is to provide a bidirectional guide system which limits lateral displacement of the axle over an allowed range that is compatible with the boundaries of the vehicle clearance to be observed, by using a series of stops. Thus, a certain amount of lateral displacement is allowed, up to a maximum angular deviation determined between the axle and the follower module that follow the same ground rail.

In order to prevent excessively violent shocks to these stops that limit displacement, the bidirectional guide system of the invention advantageously may also comprise a means for absorbing lateral displacement.

To achieve these objectives, the invention teaches a bidirectional guide system for the axle of a road vehicle guided along a ground rail, particularly a public urban transport vehicle.

This guide system comprises two guide devices connected to the axle and disposed in opposite directions on either side of it, each comprising a guide arm, single or double, extending toward the guide rail and supporting at least one guide roller engaged to move along the guide rail.

Each of these guide devices exists in two states: a rigid state allowing it to orient the axle, and a floating state allowing lateral displacement; depending on the direction of travel each one serves alternately either in the front as the director module, in the rigid state; or in the rear, as the follower module in the floating state.

According to the invention, each guide device comprises:
 a deformable connecting interface between the axle and the guide arm, which, because of its deformable nature, allows lateral displacement of the axle relative to the guide rail; and
 a cylinder with two independent and opposing shafts that assume two characteristic positions: an "extended shafts" position placing the guide device in the rigid state, in which position the two cylinder shafts are maximally extended and block the connecting interface so as to form a rigid connecting interface between the axle and the guide arm and orient the axle to guide it; and a "retracted shafts" position placing the guide device in the floating state, in which position its two shafts are maximally retracted, freeing the deformable interface and allowing lateral displacement.

Preferably the bidirectional guide system according to the invention further comprises a series of stops to limit lateral displacement.

Advantageously it may also comprise a means for absorbing lateral displacement.

According to one variation of the invention, this bidirectional guide system may further comprise a pivot plate connected to the axle so as to be either fixed or articulated and to which the two guide devices are attached, each facing in the opposite direction.

Preferably the deformable connecting interface on the guide system of the invention comprises a group of articulated connecting rods.

It is preferably a group of connecting rods articulately joined one after another in a series with their free extremities articulated to the axle or to the pivot plate so that the rods, together with the axle or plate, form a polygon, specifically a trapezoid or a parallelogram that is deformable in a generally horizontal plane.

BRIEF DESCRIPTION OF THE DRAWINGS

Other characteristics and features of the invention will be apparent from reading the following detailed description, taken with reference to the accompanying drawings, in which.

DETAILED DESCRIPTION OF THE DRAWINGS

Figure 1:
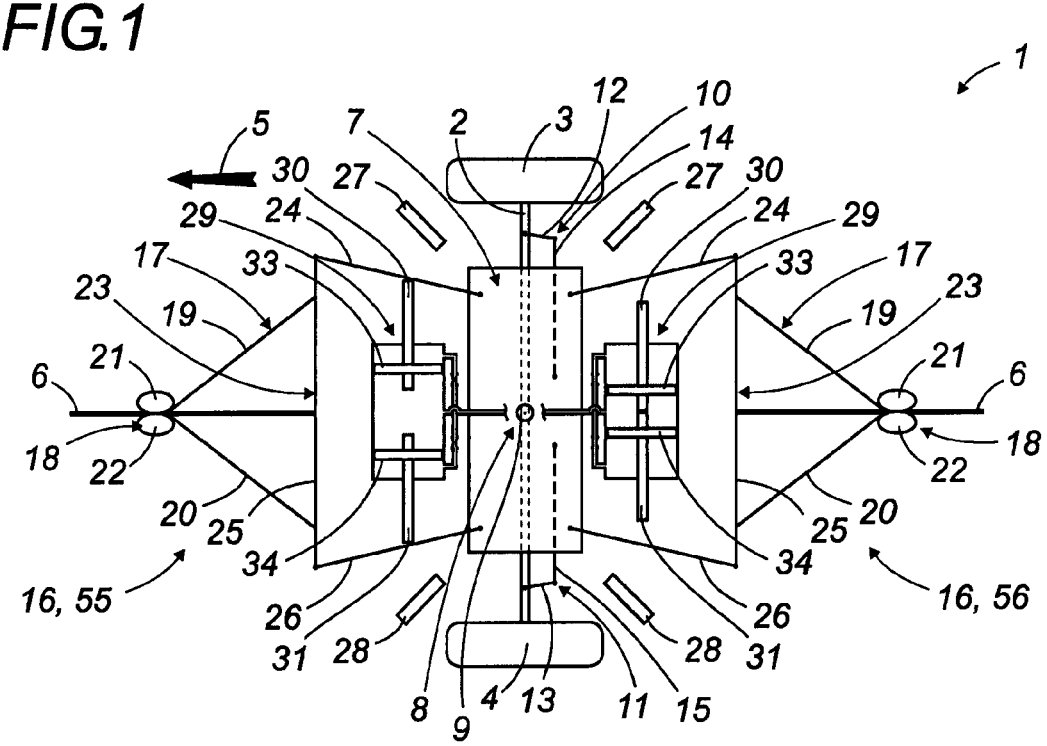
FIG. 1 is a schematic representation of a bidirectional guide system according to the invention attached to a road vehicle axle during the normal situation of traveling along a straight portion of its trajectory.

The bidirectional guide system of the invention will now be described in detail with reference to FIGS. 1 through 8. Equivalent elements in different drawings will bear the same reference numerals. Similarly, since the two guide devices preferably are identical, their common elements will bear the same reference numerals.

In the following description, what is meant by front and rear will be defined relative to the direction of vehicle travel. Obviously this orientation can be reversed if the vehicle changes its direction of travel.

FIGS. 1 through 4 are a schematic representation of a bidirectional guide system 1 according to the invention in its characteristic states.

The purpose of this guide system 1 is to orient an axle 2 joining two wheels 3 and 4 equipped with tires belonging to a guided road vehicle, particularly a public urban transport vehicle.

In the example shown the road vehicle is being displaced in the direction of arrow 5 along a guide rail 6 on the ground.

Figure 2:
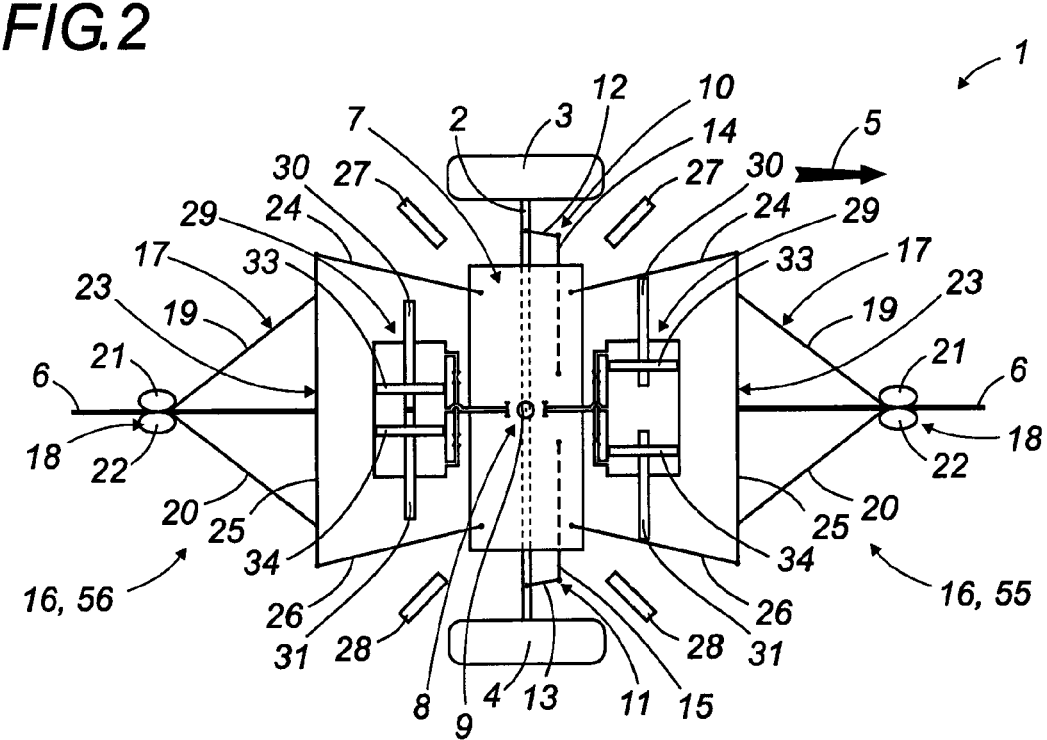
FIG. 2 is a view similar to FIG. 1 corresponding to vehicle displacement in the reverse direction.

As will be explained below and as FIGS. 1 and 2 illustrate, guide system 1 of the invention is bidirectional and it can also guide the vehicle in the opposite direction of travel.

Guide rail 6 as shown is preferably located in the ground in a central position relative to the vehicle. However, a person skilled in the art could easily adapt the guide system of the invention to another type of guide rail, more specifically, a dual ground rail system.

In the case of an axle 2 with drive wheels, guide system 1 preferably comprises a pivot plate 7 attached to axle 2 by means of an articulation 8 shown schematically in the form of a central connecting contact 9.

As shown, rotational movement is transmitted to wheels 3 and 4 on each side by means of a directional linkage, 10 and 11, respectively, connected by articulations on one side to axle 2 near corresponding wheel 3 or 4 and on the other side to pivot plate 7, each linkage 10, 11 comprising in succession a directional lever 12, 13 and a directional rod 14, 15 connected to one another by an articulation means.

In the case of a rigid axle, not shown, pivot plate 7 is fixed relative to axle 2 or may even be omitted.

Guide system 1 according to the invention comprises two guide devices 16, preferably identical, disposed in opposite directions on either side of axle 2.

These guide devices 16 are attached to pivot plate 7 and thus are connected to axle 2 by means of said plate 7, or they may be attached directly to axle 2 when the system has no pivot plate 7.

Each of the guide devices 16 comprises a guide arm 17 extending toward guide rail 6 and holding at its end at least one guide roller 18 engaged in travel along guide rail 6.

In the preferred embodiment shown there is a dual guide arm 17 formed of twin branches 19 and 20 converging toward guide rail 6 and holding at their free end a pair of guide rollers 18, 21 and 22, respectively, angled at a V and each moving along a pathway formed in one of the sides of guide rail 6.

Obviously it is possible to conceive of other variations where guide arm 17 is a single arm, or for example where rollers 18 vary in number or in arrangement.

Each guide device 16 also comprises a deformable connecting interface 23 between the axle 2 and the guide arm 17, more specifically between pivot plate 7 and guide arm 17 in the example shown.

This connecting interface 23 is preferably constructed as a group of connecting rods articulated to one another in a series, the free ends of which are articulated to axle 2 or to pivot plate 7 in such a way that the group of connecting rods forms with the axle or plate a polygon that is deformable in a generally horizontal plane.

According to the preferred embodiment shown, each guide device 16 advantageously comprises three connecting rods joined one after another in a series, respectively: an end connecting rod 24, a central or traversing connecting rod 25, and another end connecting rod 26, with the two end connecting rods 24 and 26 preferably being the same length and shorter than central connecting rod 25.

The free ends of end connecting rods 24 and 26 are articulated to pivot plate 7 or directly to axle 2 so that the group of connecting rods forms with the side of pivot plate 7 or with axle 2 a trapezoid or a parallelogram that is deformable in a generally horizontal plane.

Guide arm 17 is connected to the group of connecting rods, preferably to the central connecting rod 25 and preferably in a symmetrical fashion when it is formed of two twin branches 19 and 20.

A lateral displacement of axle 2 relative to guide rail 6 is therefore made possible by the ability of connecting interface 23 to deform in a generally horizontal plane between pivot plate 7 and guide arm 17, or more generally, between axle 2 and guide arm 17.

The amplitude of this displacement is preferably limited by a group of stops, such as stops 27 and 28, for example, which connecting interface 23 abuts when this interface has attained the maximum allowed displacement in one direction or the other. Preferably, these stops, as shown, are two in number on each guide device 16, one for each limit position of the connecting interface 23.

The placement of these stops is defined by design as a function of the characteristics of the travel terrain and of the maximum allowed vehicle clearance. These stops may be placed either on the interior or the exterior of the group of connecting rods and they may be supported by pivot plate 7, for example, or by any other appropriate element on the vehicle.

Additionally, each guide device 16 comprises a cylinder 29, preferably hydraulic, with two independent, opposing shafts 30 and 31. This cylinder has been shown in isolation and in greater detail in FIGS. 6 and 7 in its two characteristic positions, that is, in the "retracted shafts" position in FIG. 6 and in the "extended shafts" position in FIG. 7.

Cylinder 29 comprises a body 32, preferably cylindrical, within which two pistons 33 and 34 are displaced, each respectively connected to one of the shafts 30 and 31.

The interior space of cylinder body 32 is thus divided into a central chamber 35 and two annular end chambers 36 and 37, respectively located between and on either side of the two pistons 33, 34.

According to a preferred embodiment, each of pistons 33 and 34 is attached to one of the shafts 30 and 31 and is displaced along with it. Each piston 33 or 34 is positioned on the corresponding shaft 30 or 31 so that one portion of the shaft extends beyond each side of the piston, thus defining for each shaft an interior portion 38 and 39, respectively, located in the central chamber 35 of the cylinder, and an exterior portion, 40 and 41, respectively, extending into the corresponding annular end chamber 36 or 37 and beyond the chamber. It is apparent that other equivalent embodiments are possible.

The exterior portion 40, 41 of shafts 30 and 31 is longer than the interior portion 38, 39 and it extends beyond body 32 of the cylinder, passing on either side through the corresponding end wall 42, 43 of body 32.

A sealing means such as seal 44 and 45 seals body 32 of the cylinder at this level. This sealing means is located for example on the interior surface of the end walls 42 and 43 and ensures a fluid-tight sliding of the exterior portion 40, 41 of shafts 30 and 31.

Central chamber 35 of the cylinder is supplied with fluid by a supply conduit 46 through a circuit, one example of which will be described with reference to FIG. 8.

According to a preferred embodiment of the invention, the two annular end chambers 36 and 37 of cylinder 29 communicate through a fluid communication conduit 47 connecting them to each other. Preferably, this fluid communication conduit 47 comprises one or more constricted areas 48 whose function will be described below.

Figure 7:
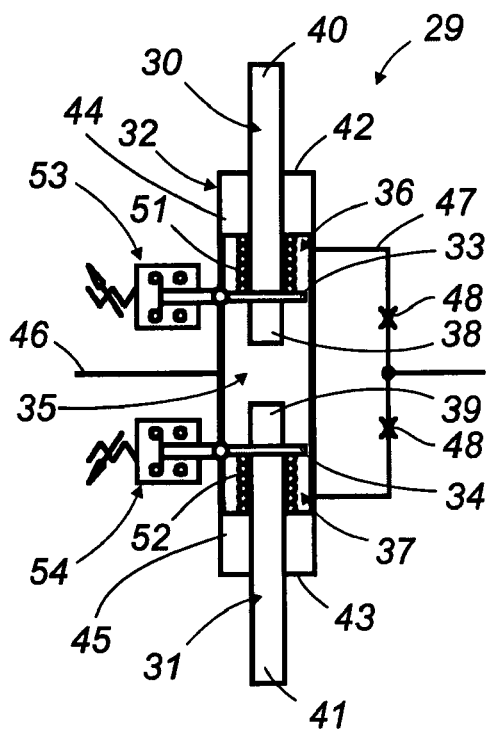
FIG. 7 is an isolated schematic view of a double shaft cylinder of the guide system of the invention in the "extended shafts" position.

When the pressure in central chamber 35 is higher than the pressure in annular end chambers 36 and 37, pistons 33 and 34 separate from one another and are displaced toward the end walls 42 and 43 of body 32, causing exterior portions 40, 41 of shafts 30 and 31 to extend out of the cylinder up to a maximum position called the "extended shafts" position, which is the position of cylinder 29 shown in FIG. 7 and of the front cylinder in FIGS. 1 through 4.

In this position the free ends of exterior portions 40, 41 of shafts 30, 31 block, either directly or indirectly, connecting interface 23 so as to form a rigid connecting interface between pivot plate 7 or axle 2 and guide arm 17.

Figure 3:
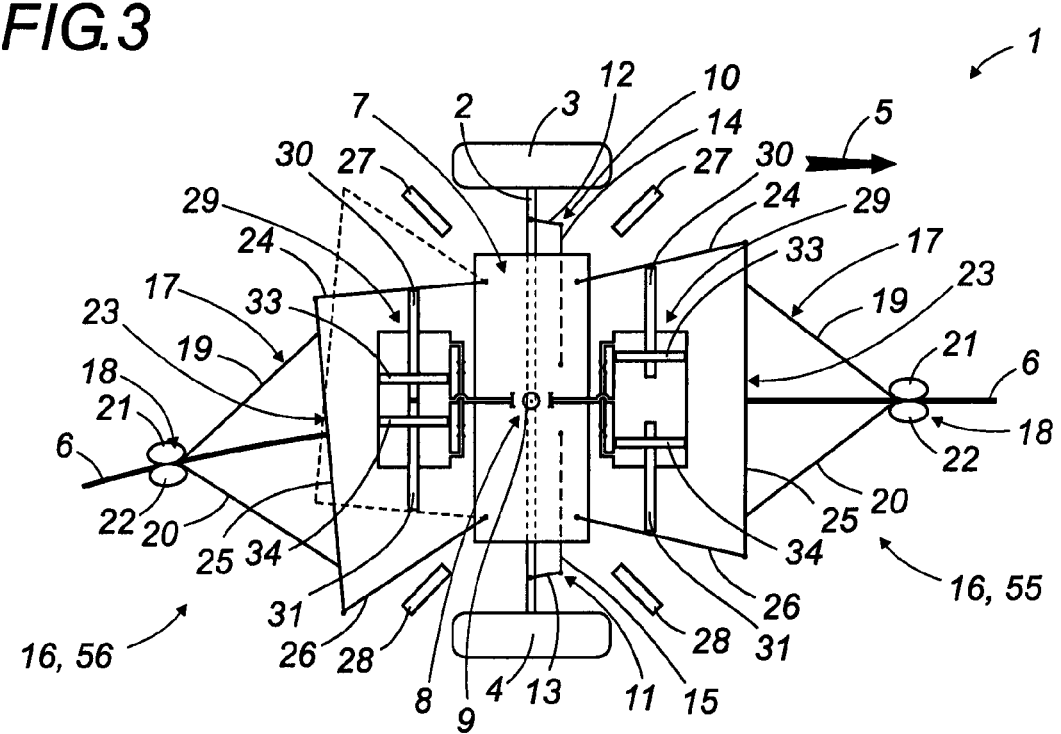
FIG. 3 is a schematic representation of the bidirectional guide system of FIG. 2 undergoing lateral displacement, for example, associated with a curve on its trajectory.
Figure 4:
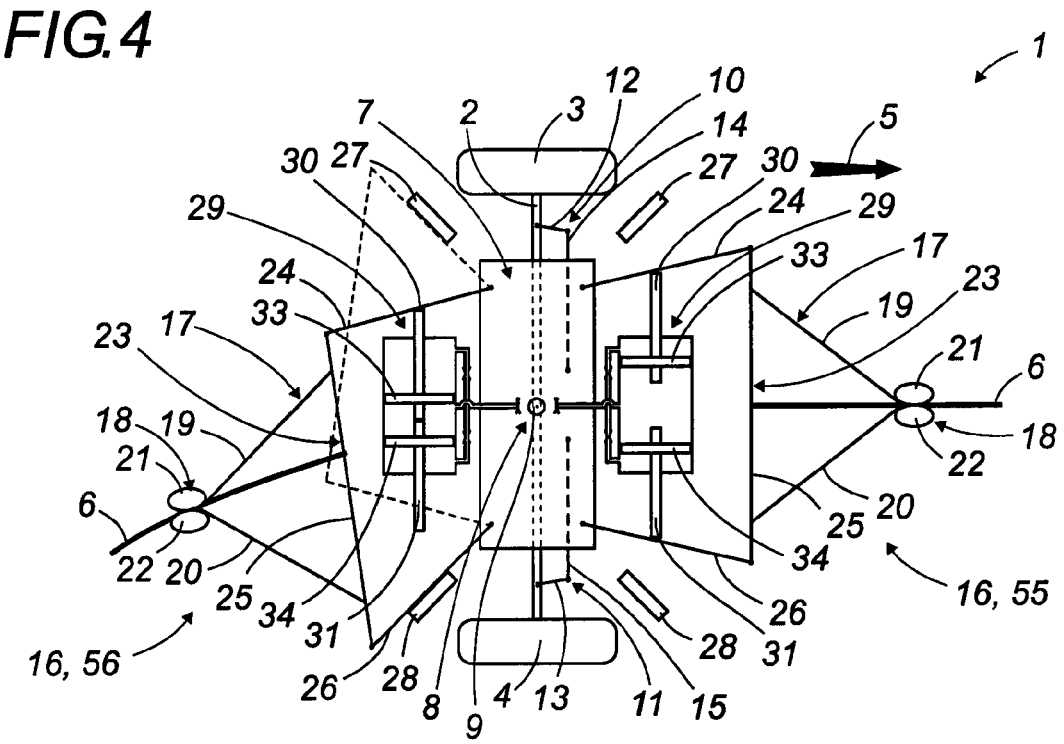
FIG. 4 is a schematic representation of the bidirectional guide system of FIG. 2 in the position of maximum allowed lateral displacement.
Figure 5:
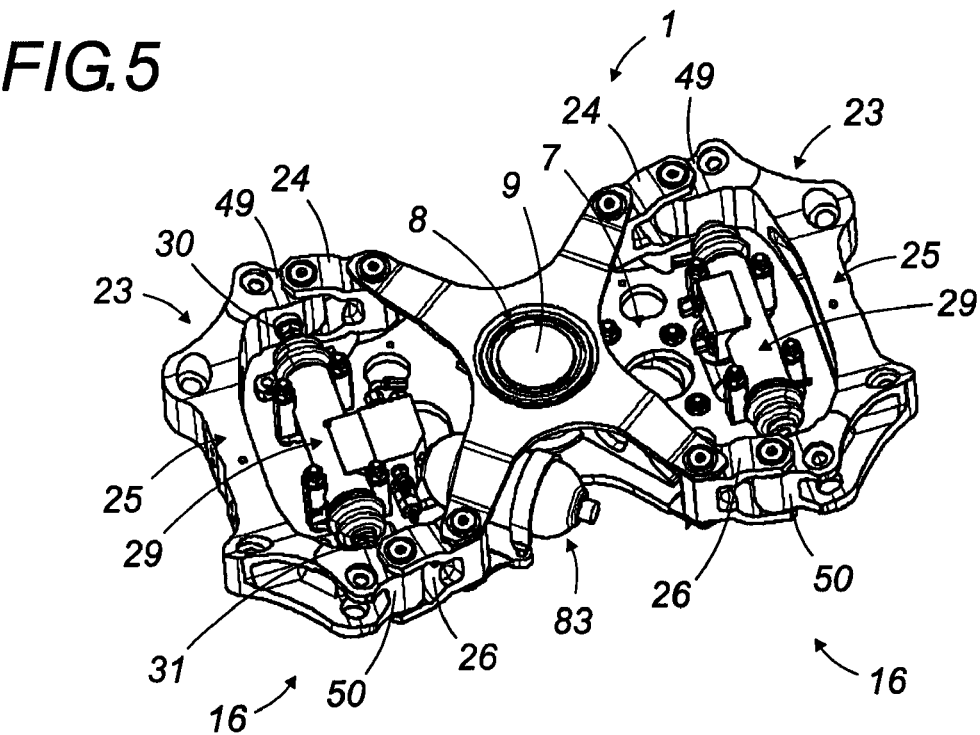
FIG. 5 is a perspective view of the central portion of the bidirectional guide system according to a preferred embodiment of the invention.
Figure 6:
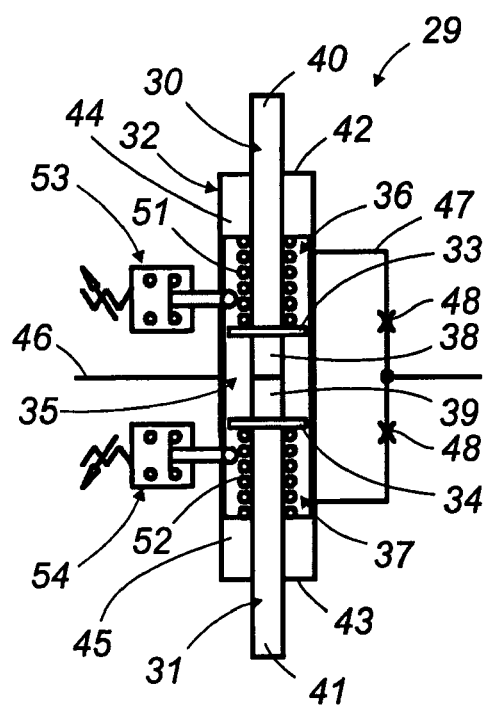
FIG. 6 is an isolated schematic view of a double shaft cylinder in the guide system of the invention in the "retracted shafts" position.

To achieve this blocking, the free end of the exterior portion 40, 41 of shafts 30 and 31 may push directly against one or more rods of the connecting interface 23, for example, against the two end connecting rods 24 and 26 as in the variation shown schematically in FIGS. 1 through 4 or against an end return, 49 and 50, respectively, of central connecting rod 25 as in the embodiment of FIG. 5.

Blocking may also be accomplished indirectly by means of any type of intermediate device conceived by a person skilled in the art, for example a mechanical, hydraulic, electrical, electronic device, or other type of device, to control the blocking of connecting interface 23 when cylinder 29 is in the "extended shafts" position.

Advantageously, when pistons 33 and 34 are displaced apart from one another towards end walls 42, 43, they preferably each compress a spring, 51 and 52, respectively, located between the piston concerned and the corresponding end wall 42 or 43, or else as shown, between the piston concerned and the seal 44, 45 covering the base of the corresponding annular end chamber 36, 37.

The function of these springs 51, 52 is the elastic recall of pistons 33 and 34 generally toward the center of the interior of body 32 of the cylinder. According to another variation not shown, these springs may also be placed outside body 32 of cylinder 29 and act directly on shafts 30 and 31.

According to a preferred embodiment of the invention, guide devices 16 are also equipped with one or more sensors such as sensors 53 and 54 to detect when cylinder 29 is in the "extended shafts" position. It is also possible to add one or more supplemental sensors to detect other cylinder positions, especially the "retracted shafts" position.

When the pressure in central chamber 35 is lower than that of annular end chambers 36 and 37, pistons 33 and 34 approach each other, progressively decompressing recall springs 51 and 52. The zone of the exterior portion 40, 41 of shafts 30, 31 that extends beyond end walls 42 and 43 of body 32 decreases progressively until the free end of the interior portions 38, 39 of shafts 30 and 31 contact each other, thus defining the minimum size of central chamber 35. Cylinder 29 is then in a configuration called the "retracted shafts" position, as shown by cylinder 29 in FIG. 6 and the rear cylinder in FIGS. 1 through 4. However, even in this position, a portion of shafts 30 and 31 continues to extend beyond body 32 of cylinder 29.

In this position connecting interface 23 is free and corresponding guide device 16 floats, allowing lateral displacement of axle 2 relative to guide rail 6.

Thus, guide devices 16 exist in two states which they occupy alternately:
- a rigid state corresponding to the "extended shafts" position of cylinder 29 in which connecting interface 23 is blocked and forms a rigid connecting interface between pivot plate 7 or axle 2 and guide arm 17, orienting the axle and thus guiding it correctly;
- a floating state corresponding to the "retracted shafts" position of cylinder 29 in which connecting interface 23 is deformable in a generally horizontal plane, thus allowing lateral displacement of the axle.

Depending upon the direction the vehicle is traveling, symbolized by arrow 5 in FIGS. 1 through 4, guide device 16 located at the front serves as the director module 55 and guide device 16 located at the rear serves as the follower module 56.

For this reason, director module 55 is placed in the rigid state by the passage of its cylinder 29 into the "extended shafts" position and follower module 58 is placed in the floating state by the passage of its cylinder 29 into the "retracted shafts" position. Obviously, this configuration is reversed when the vehicle changes its direction of travel.

The passage of these modules into their appropriate configuration relative to the vehicle's direction of travel may be controlled manually, for example, by the vehicle conductor, or automatically, for example, when starting the driving unit specific to the direction of travel.

Controlling the rigid state of director module 55, which is indispensable for guiding the vehicle correctly, may advantageously be done by sensors 53 and 54 on this module which detect when cylinder 29 is in the "extended shafts" position.

As previously mentioned, follower module 56, which is in the floating state, allows a certain amount of lateral displacement. FIGS. 3 and 4 are an illustration of this possibility for lateral displacement, for example, in the vicinity of a curved portion of guide rail 6.

The maximum amplitude of this displacement is fixed by the position of stops 27 and 28. One of these limit positions, which corresponds to the maximum possible displacement on each side, has been shown in FIG. 4. In the position shown, deformable connecting interface 23 formed of the connecting rods butts against stop 28 which opposes any additional displacement.

Obviously, displacement can occur symmetrically on the other side. In that case deformable connecting interface 23 butts against block 27 as shown by dotted lines in FIG. 4.

According to a preferred embodiment of the invention the guide system comprises a means of damping lateral displacement in order to avoid for example violent shocks between connecting interface 23 and stops 27 and 28. This damping of displacement is a supplemental function of cylinder 29 on guide device 16.

To facilitate the reader's understanding, one example of such a lateral displacement damper has been shown in FIGS. 2 through 4. In this example and in the portion of the description referring to it, displacement is produced in the direction of stop 28. Naturally it can take place in the same way in the other direction toward stop 27. In this case, the system functions in the identical way with the symmetrical elements on the device.

For lateral displacement to be possible cylinder 29 on guide device 16 located in the rear (follower module 56) is placed in the "retracted shafts" position. In the absence of displacement, this guide device 16 is in the configuration shown in FIG. 2.

When lateral displacement is produced, connecting interface 23 deforms and is displaced in the direction of one of the vehicle's sides towards one of the stops 27, 28—for example, toward stop 28 in the example shown.

During this displacement and before abutting stop 28, connecting interface 23, or more specifically here, end connecting rod 24, enters into contact with the end of exterior portion 40 of shaft 30 extending beyond body 32 of cylinder 29. The device is then in the configuration shown in FIG. 3.

When the displacement ensues, connecting interface 23 continues to be displaced toward stop 28. In so doing, it also drives shaft 30 of cylinder 29 along with it.

Since interior portions 38 and 39 of shafts 30 and 31 are in contact when cylinder 39 is in the "retracted shafts" position, shafts 30 and 31, as well as pistons 33 and 34, are displaced together as a unit when a force is exerted on the projecting portion of one of the shafts 30 or 31. Such a displacement of pistons 33, 34 causes one of the end annular chambers 36 or 37 of cylinder 29 to become enlarged to the detriment of the other end chamber, which is made possible by the fluid communication existing between the two end chambers 36 and 37 through communication conduit 47.

When end connecting rod 24 drives shaft 30 of cylinder 29, the end annular chamber 36 of cylinder 29 becomes enlarged, while the end annular chamber 37 decreases in size. For this reason, a portion of the fluid initially present in end chamber 37 passes into end chamber 36 through communication conduit 47. The fluid is thus obliged to pass through constricted portions 48 in conduit 47, causing a throttling effect and a decrease in flow rate. Movement of the unit of shafts 30 and 31 slows down, consequently damping the displacement of connecting interface 23 and more generally, the lateral displacement.

It should be noted that during these displacements, when cylinder 29 is in the "retracted shafts" position, there is no change in volume of central chamber 35, as shafts 30 and 31 are in contact, nor in the total volume of the annular end chambers 36 and 37 by transferring oil from one chamber into the other.

Therefore there is no variation in pressure toward the exterior of these chambers during the damping movement. Pressure obviously mounts in annular end chamber 37 due to the slowdown of oil transfer caused by constricted areas 48, which is precisely the damping effect desired.

The movement of connecting interface 23 thus proceeds in a damped manner up to the limit position shown in FIG. 4, corresponding to the maximum allowed lateral displacement and in which end connecting rod 26 contacts stop 28. Thanks to the damping effect produced by cylinder 29, this contact takes place without any violent shock that could damage the device.

During the displacement of pistons 33 and 34 under the force exerted by end connecting rod 24 on shaft 30, spring 52 is compressed progressively.

When lateral displacement ends, connecting interface 23 reassumes its initial position. Simultaneously, spring 52 becomes extended and elastically constrains piston 34 until it essentially finds its initial position. Consequently, shafts 30 and 31 and piston 33 are also displaced together. Cylinder 29 then resumes it initial configuration as shown in FIG. 2.

Obviously this is an approximate position. In actuality, two springs in opposition cannot produce a precise position, specifically due to the friction that must be overcome and which opposes the action of the springs in an unbalanced fashion, or due to differences that may exist between the two springs. However, this situation is not problematic because the only recall sought is a recall approximately toward the center.

According to a preferred feature of the invention, it will be noted that no matter what position the cylinder is in and even when shafts 30 and 31 of cylinder 29 are at the limit position in one direction or the other, supply conduit 46 remains free and capable of supplying central chamber 35 in cylinder 29 so that at any given moment, it is capable of causing the cylinder to pass into the "extended shafts" safety position.

One example of a simplified hydraulic circuit compatible with the bidirectional guide system of the invention will now be described with reference to FIG. 8.

This circuit is composed of four principal functional groups: one hydraulic group 57, two cylinder blocks 58 and 59, and one hydraulic spring 60.

The purpose of the hydraulic group 57 is to supply the various elements on the circuit with hydraulic fluid, more specifically and preferably, with oil.

To do this, hydraulic group 57 comprises a buffer reservoir 61, also called a tank, containing oil and placed at atmospheric pressure.

It also comprises a pump 62 actuated by a motor 63 that suctions oil from buffer reservoir 61 through conduit 64 and sends it under pressure throughout the rest of the circuit through supply conduit 65. In the usual way, pump 62 is protected by an anti-return valve 66.

Supply conduit 65 separates into two branches 67 and 68, each leading to one of the cylinder blocks 58 or 59. On each one of these branches 67, 68 there is a two position distributor, 69 or 70 respectively, which, depending on its position, either places the branch in question in communication with a connecting conduit 71 or 72 connected to corresponding cylinder block 58, 59, or blocks it. In the latter case, distributor 69, 70 places corresponding connecting conduit 71 or 72 in communication with a conduit 73 that returns to buffer reservoir 61. Thus, depending on the position of corresponding distributor 69, 70, each connecting conduit 71 or 72 communicating with one of the cylinder blocks 58, 59 is either placed under pressure or connected to the tank.

Each cylinder block 58 and 59 comprises a cylinder 29 with two independent and opposing shafts 30 and 31, as previously described.

Each connecting conduit 71, 72 splits into one conduit, 74 and 75, respectively, leading toward hydraulic spring 60 and one conduit, 76 and 77, respectively, leading toward corresponding cylinder block 58, 59 and connected to cylinder 29 at the level of communication conduit 47 so as to supply its annular end chambers 36 and 37.

Conduits 74 and 75 terminate at hydraulic spring 60 via a group of anti-return valves 78 and they extend through a single conduit 79 traversing the functional block of the hydraulic spring 60 to again split at the outlet into two conduits 80 and 81, each leading toward a cylinder block 58, 59 and serving as a supply conduit 46 for central chamber 35 in cylinder 29.

Hydraulic spring 60 comprises in succession along conduit 79 a pressure reducer 82 and an accumulator 83, the interior of which is divided into two chambers 84 and 85 by a membrane 86. The first chamber 84 in accumulator 83 is tightly closed and contains pressurized gas, preferably nitrogen. The second chamber 85 communicates with the hydraulic circuit and serves as a hydraulic liquid reserve.

Preferably a pressure sensor 87 may be provided near accumulator 83 in order to monitor the pressure in the accumulator circuit.

The operation of this hydraulic circuit is obvious from the preceding description.

Figure 8:
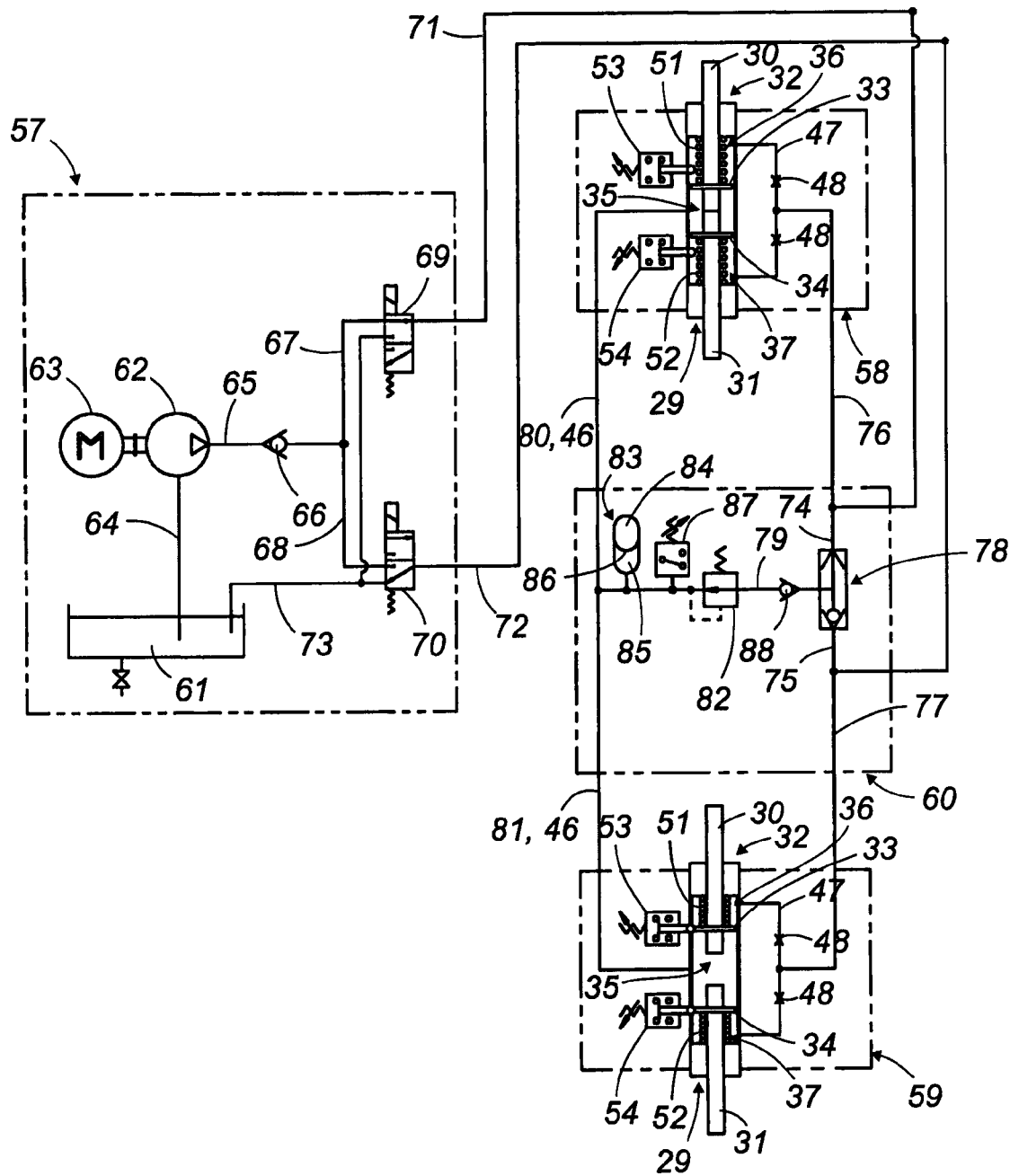
FIG. 8 is a simplified hydraulic schematic view of one embodiment of the bidirectional guide system for a road vehicle axle according to the invention.

When the vehicle travels, cylinder 29 located at the front, corresponding to cylinder block 59 in FIG. 8, must be placed in the "extended shafts" position while the one located at the rear, corresponding to cylinder block 58, must be in the "retracted shafts" position.

To do this, distributor 69 is placed in its position which connects branch 67 to connecting conduit 71. Pump 62 then sends pressurized oil into annular end chambers 36 and 37 in cylinder block 58 via conduits 65, 67, 71, 76 and 47.

Pressurized oil flowing from conduit 71 is also sent through conduit 74 toward hydraulic spring 60 via the network of anti-return valves 78. The oil completely fills chamber 85 in accumulator 83 after undergoing a decrease in pressure as it passes through pressure reducer 82.

Central chamber 35 in cylinder block 58, in fluid communication with chamber 85 in accumulator 83, is thus subjected to pressure lower than that of annular end chambers 36 and 37 directly connected to pump 62. Pistons 33 and 34 are thus pressed toward each other until shafts 30 and 31 are in contact, thus placing cylinder 29 of block 58 in the "retracted shafts" position.

The pressure decrease brought about by pressure reducer 82 has to be sufficient for the fluid contained in annular end chambers 36 and 37 to cause the retraction of shafts 30 and 31. Actually, there is conventionally a difference in the extent of the surface subjected to pressure. On the side of central chamber 35, pressure is exerted over the entire surface of pistons 33 and 34, whereas on the side of the annular chambers, it is exerted only over the annular surfaces corresponding to the surface of the piston concerned, excluding the corresponding shaft.

Furthermore, distributor 70 is placed in its position that interrupts branch 68 and places connecting conduit 72 in communication with conduit 73 returning to buffer reservoir 61.

End chambers 36 and 37 on cylinder 29 of cylinder block 59 communicate with buffer reservoir 61 via conduits 73, 72, 77 and 47 and thus are placed at atmospheric pressure.

Central chamber 35 in cylinder 29 is connected to chamber 85 in accumulator 83 via conduits 81 and 79, and thus its pressure is higher than atmospheric pressure. Pistons 33 and 34 are pushed apart, compressing springs 51 and 52 and placing cylinder 29 of cylinder block 59 into the "extended shafts" position.

Advantageously the role of hydraulic spring 60 is to constrain cylinders 29 by default in the "extended shafts" position. This is the safest position for the vehicle because it ensures permanent stable guidance of the vehicle, which can function even if it wears out the guide rollers which must take up all the stress. This is not the case when the two cylinders are in the "retracted shafts" position.

Advantageously, with the guide system of the invention, this security position is obtained passively and it is the passage into the "retracted shafts" position that necessitates actuation of pump 62.

In the same way, distributors 69 and 70 must be supplied with electricity so they can supply annular end chambers 36, 37 in cylinders 29 and provoke passage into the "retracted shafts" position. Therefore, in case the electrical supply is lost, the shafts of cylinders 29 extend automatically.

If pump 62, or more generally hydraulic group 57, stops or malfunctions or if there is a leak in the conduits situated between hydraulic group 57 and cylinder blocks 58 and 59, accumulator 83 advantageously ensures that cylinders 29 automatically pass into the "extended shafts" safety position.

For safety reasons a supplemental anti-return valve 88 is preferably provided to prevent chamber 85 in accumulator 83 from emptying if a break occurs in one of the conduits located between hydraulic group 57 and cylinder blocks 58 and 59 or hydraulic spring 60.

Preferably, and as a preventive construction measure, the conduits situated between accumulator 83 and cylinder blocks 58 and 59 are made in the form of rigid pipes that are as short as possible so as to limit the risk of leaks. Hydraulic spring block 60 may even be directly attached by a flange onto one of the two cylinders 29 so as to minimize the number of pipes.

In FIG. 8 a simplified hydraulic circuit is shown comprising only two cylinder blocks 58 and 59 attached to an axle 2. It is quite apparent that this circuit may be more complex and comprise, for example, several other cylinder blocks arranged in groups of two for guiding supplemental axles. These groups of two supplemental cylinder blocks preferably each cooperate with a supplemental hydraulic spring. Preferably, they can be supplied in parallel by the same hydraulic group 57. Their function is identical to the function described previously.

The bidirectional guide system of the invention advantageously has an intrinsic stress limiter associated with the hydraulic operation mode described above. Indeed, if sudden stress is exerted on the guide system when it is in the "extended shafts" position, for example, if there are large rough spots in the path, the shafts retract partially if the force they are subjected to is greater than the pressure in the accumulator, thus protecting the mechanical parts of the device. The accumulator pressure may advantageously be chosen and set according to the maximum acceptable level of stress on the device.

It is apparent that the invention is not limited to the preferred embodiments described and shown in the different drawings, since a person skilled in the art may conceive of numerous modifications and other variations without departing from the scope or the intent of the invention.

Thus, for example, the guide system of the invention may be applied to a vehicle that always travels in the same direction in order to control and preferably damp its lateral displacement. In this case, the guide device placed at the front of the axle may be modified so that it is always rigid or it may be replaced by a guide device that is constructed to be rigid.

The invention claimed is:

1. A bidirectional guide system (1) for an axle (2) on a road vehicle guided by a guide rail (6), the guide system comprising:
   two guide devices (16) attached to the axle (2) and arranged in opposite directions on either side of the axle, each of the two guide devices (16) comprising a guide arm (17), either single or double, extending toward the guide rail (6) and holding at least one guide roller (18) for travel engagement along the guide rail (6), each of the two guide devices (16) having a rigid state for orienting the axle (2) and a floating state for allowing lateral displacement, and serving alternately depending upon a direction of travel of the vehicle, either at a front as a director module (55) in the rigid state, or at the rear as a follower module (56) in the floating state, each of the two guide devices (16) comprising:
      a deformable connecting interface (23) between the axle (2) and the guide arm (17) which, because of a deformable nature, facilitates lateral displacement of the axle (2) relative to the guide rail (6); and
      a cylinder (29) with two independent, opposing shafts (30, 31) that assumes two characteristic positions:
         an extended shafts position placing the guide device (16) into the rigid state, in which position the opposing shafts (30, 31) are extended to a maximum and block the connecting interface (23) so as to form a rigid connecting interface between the axle (2) and the guide arm (17) allowing orientation of the axle (2) in order to guide the axle (2); and
         a retracted shafts position placing the guide device (16) into the floating state in which position the opposing shafts (30, 31) are retracted to another maximum and leave the connecting interface (23) free, allowing lateral displacement.

2. The bidirectional guide system according to claim 1, wherein a pivot plate (7) is connected to the axle (2), either fixed or by an articulation (8) and on which the two guide devices (16) are attached in opposite directions from each other.

3. The bidirectional guide system according to claim 1, wherein the deformable connecting interface (23) comprises a group of articulated connecting rods.

4. The bidirectional guide system according to claim 1, wherein the deformable connecting interface (23) is a group of connecting rods articulately joined in series one after another, and free ends thereof are either articulated to the axle (2) or to a pivot plate (7) such that the group of connecting rods forms a polygon, with either the axle or the pivot plate, that is deformable in a generally horizontal plane.

5. The bidirectional guide system according to claim 1, wherein the deformable connecting interface (23) comprises a first end rod (24), a central rod (25) and a second end rod (26) articulately joined in series one after another and articulated either to the axle (2) or to a plate (7) so as to form, with either the axle or the pivot plate, one of a trapezoid and a parallelogram that is deformable in a generally horizontal plane.

6. The bidirectional guide system according to claim 5, wherein the first end rod (24) and the second end rod (26) have the same length and are shorter than the central rod (25).

7. The bidirectional guide system according to claim 1, wherein a series of stops (27, 28) limit lateral displacement.

8. The bidirectional guide system according to claim 7, wherein each of the two guide devices (16) has two stops (27, 28) on which the deformable connecting interface (23) abuts when the connecting interface (23) attains a maximum lateral displacement.

9. The bidirectional guide system according to claim 1, further comprising a means (48) for damping lateral displacement.

10. The bidirectional guide system according to claim 1, wherein the cylinder (29) has a supplemental function of damping lateral displacement.

11. The bidirectional guide system according to claim 10, wherein the deformable connecting interface (23) has a capacity, by virtue of its deformation, to drive one of the opposing shafts (30, 31) of the cylinder (29) and thus causing damping of the lateral displacement.

12. The bidirectional guide system according to claim 1, wherein the cylinder (29) has a cylindrical body (32) within which two pistons (33, 34) are displaced, each of the two pistons (33, 34) is integral with one of the opposing shafts (30, 31) of the cylinder (29) and divides an interior space of the body into a central chamber (35) and two annular end chambers (36, 37), respectively, located between and on either side of the two pistons (33, 34).

13. The bidirectional guide system according to claim 12, wherein the pistons (33, 34) are attached to the corresponding shaft (30, 31) of the cylinder (29) such that a portion of the shaft extends beyond either side of the piston, thus defining an interior portion (38, 39) in each shaft located in a central chamber (35) of the cylinder, and an exterior portion (40, 41) extends into a corresponding annular end chamber (36, 37) and beyond it, with the free ends of the interior portions (38, 39) of the two shafts (30, 31) of the cylinder contacting each other when the cylinder is in the retracted shafts position.

14. The bidirectional guide system according to claim 12, wherein the central chamber (35) of the cylinder (29) is supplied with fluid through a supply conduit (46) that remains free and capable of supplying the central chamber regardless of the position of the cylinder.

15. The bidirectional guide system according to claim 12, wherein a communication conduit (47) joins the two annular end chambers (36, 37) of the cylinder (29) with one another.

16. The bidirectional guide system according to claim 15, wherein the communication conduit (47), joining the two annular end chambers (36, 37) with one another, comprises at least one constricted portion (48).

17. The bidirectional guide system according to claim 12, wherein springs (51, 52) elastically recall the pistons (33, 34) toward a center inside the body (32) of the cylinder (29).

18. The bidirectional guide system according to claim 1, wherein each guide device (16) comprises at least one sensor (53, 54) for detecting when the cylinder (29) is in the extended shafts position.

19. The bidirectional guide system according to claim 1, wherein the guide system is hydraulic and comprises a hydraulic circuit with a hydraulic group (57) for supplying various elements in the hydraulic circuit with hydraulic fluid, at least two cylinder blocks (58, 59) and at least one hydraulic spring (60) for constraining the cylinders (29) in the extended shafts position.

20. The bidirectional guide system according to claim 19, wherein the hydraulic group (57) comprises a buffer reservoir (61), a pump (62), which is actuated by a motor (63), and two distributors with two positions (69, 70).

21. The bidirectional guide system according to claim 19, wherein the hydraulic spring (60) comprises a pressure reducer (82) and an accumulator (83), an interior portion of the accumulator (83) is divided into two chambers (84, 85) by a membrane (86), one of the two chambers (84) is sealed tightly and contains pressurized gas, and a second of the two chambers (85) communicates with the hydraulic circuit and serves as a hydraulic fluid reserve.

22. The bidirectional guide system according to claim 21, wherein conduits located between the accumulator (83) and the at least two cylinder blocks (58, 59) are rigid, short pipes.

* * * * *